(12) United States Patent
Bove

(10) Patent No.: US 10,688,946 B1
(45) Date of Patent: Jun. 23, 2020

(54) SWITCH SYSTEM

(71) Applicant: Evobic Holdings LLC, Conifer, CO (US)

(72) Inventor: Scott R. Bove, Conifer, CO (US)

(73) Assignee: Evobic Holdings LLC, Conifer, CO (US)

( * ) Notice: Subject to any disclaimer, the term of this patent is extended or adjusted under 35 U.S.C. 154(b) by 0 days.

(21) Appl. No.: 16/449,192

(22) Filed: Jun. 21, 2019

(51) Int. Cl.
*B60R 16/023* (2006.01)
*B60R 16/02* (2006.01)
*B60K 37/06* (2006.01)
*B60R 16/033* (2006.01)
*B60R 11/00* (2006.01)

(52) U.S. Cl.
CPC .......... *B60R 16/0238* (2013.01); *B60K 37/06* (2013.01); *B60R 16/0207* (2013.01); *B60R 16/033* (2013.01); *B60K 2370/81* (2019.05); *B60R 2011/0005* (2013.01); *B60R 2011/0047* (2013.01)

(58) Field of Classification Search
CPC .... B60K 37/04; B60K 37/06; B60K 2370/81; B60R 16/0207; B60R 2011/0005; B60R 2011/0045–0047
See application file for complete search history.

(56) References Cited

U.S. PATENT DOCUMENTS

| | | | | |
|---|---|---|---|---|
| 3,635,305 A | * | 1/1972 | Kunishi | B60K 37/02 180/90 |
| 3,662,850 A | * | 5/1972 | Foley | B60K 37/06 180/90 |
| 4,623,110 A | * | 11/1986 | Kanari | B60R 11/0205 248/27.1 |
| 5,174,621 A | * | 12/1992 | Anderson | B60K 37/02 180/90 |
| 6,651,936 B2 | * | 11/2003 | Upson | B60K 37/04 248/27.3 |
| 6,984,784 B2 | * | 1/2006 | Nagasaka | G11B 33/126 174/50 |

(Continued)

FOREIGN PATENT DOCUMENTS

WO WO-2018172043 A1 * 9/2018 ............. B60K 35/00

OTHER PUBLICATIONS

Trail Rocker Installation Instructions, 1976-1986 Jeep CJ7 4-Switch Overehead Trail Rocker for Installing Painless Part No. 57020, Painless Performance Products LLC, Fort Worth, TX, Manual # 90618, 70 pages, downloaded from www.painlessperformance.com/Manuals/57020.pdf on Mar. 26, 2020 (Year: 2016).*

(Continued)

*Primary Examiner* — Robert J Hoffberg
(74) *Attorney, Agent, or Firm* — Craig R. Miles; CR Miles P.C.

(57) ABSTRACT

Generally, a switch system for a vehicle including one or more switches electrically coupled to an electrical power distribution module each switch operable to corresponding activate or deactivate one or more accessory devices. In particular, a retrofit switch system including a switch assembly configured to insert within fascia panel pocket of a fascia panel within a vehicle and having one or more switches electrically coupled to an electrical power distribution module each switch operable to corresponding activate or deactivate one or more accessory devices.

20 Claims, 14 Drawing Sheets

(56) References Cited

U.S. PATENT DOCUMENTS

| | | | | |
|---|---|---|---|---|
| 7,527,224 B2* | 5/2009 | Nagy | ............... | B60K 37/06 |
| | | | | 248/27.1 |
| 7,530,617 B2* | 5/2009 | Kirner | ............... | B60K 37/06 |
| | | | | 296/37.12 |
| 8,979,159 B2* | 3/2015 | Ricci | ............... | B60R 11/0229 |
| | | | | 296/37.12 |
| 9,352,700 B2* | 5/2016 | Prin | ............... | B60K 37/04 |
| 9,542,085 B2* | 1/2017 | Ricci | ............... | B60K 37/00 |
| 2010/0085494 A1* | 4/2010 | Shimizu | ............ | B60K 35/00 |
| | | | | 348/837 |

OTHER PUBLICATIONS

AEV. Switch Pod for Ram Trucks. Website, https://www.aev-conversions.com/product/switch-pod-ram-trucks/, originally downloaded Jun. 19, 2019, 2 pages.

Quadratec. Mopar Auxiliary Switch Bank for 18-19 Jeep Wrangler JL & 2020 Gladiator JT. Website, https://www.quadratec.com/p/mopar/auxiliary-switch-bank-jeep-wrangler-jl, originally downloaded Jun. 26, 2019, 4 pages.

* cited by examiner

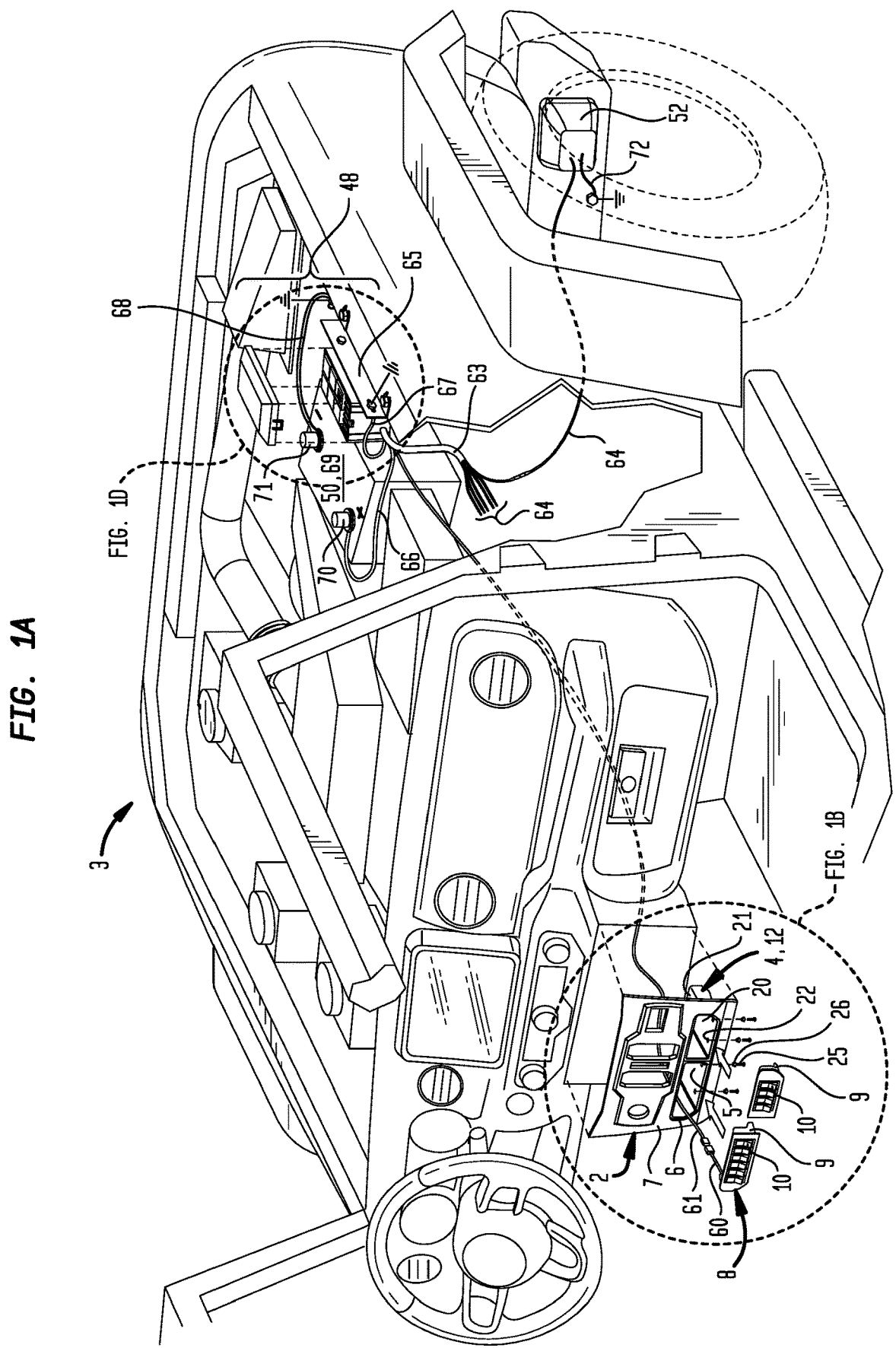

SWITCH SYSTEM

I. FIELD OF THE INVENTION

Generally, a switch system for a vehicle including one or more switches electrically coupled to an electrical power distribution module each switch operable to corresponding activate or deactivate one or more accessory devices. In particular, a retrofit switch system including a switch assembly configured to insert within fascia panel pocket of a fascia panel within a vehicle and having one or more switches electrically coupled to an electrical power distribution module each switch operable to corresponding activate or deactivate one or more accessory devices.

II. SUMMARY OF THE INVENTION

A broad object of particular embodiments of the invention can be to provide a switch system for a vehicle which includes a switch assembly and electrical power distribution module mountable in a vehicle to provide switched operation of one or more accessory devices independent of control by the electronic control unit of the vehicle. The inventive switch system addresses the need for additional switchable circuits to activate or deactivate vehicle accessory devices by user operation of one or more switches of a switch assembly mounted within the passenger compartment of the vehicle.

Another broad object of particular embodiments of the invention can be to provide a kit including a retrofit switch assembly having a plurality of switches operably supported in a switch housing configured to insert within an existing fascia panel pocket of a fascia panel of a vehicle. In particular embodiments, the switch housing can further include at least one switch housing securement feature configured to mateably engage the fascia panel pocket internal surface to secure the switch assembly in the fascia panel pocket. In particular embodiments, the switch housing securement feature operates upon alignment with one or more aperture elements disposed in said fascia panel pocket to secure the switch assembly within the fascia panel pocket and dispose the plurality of switches facing inward of the vehicle passenger compartment operably accessible to a user. The inventive retrofit switch assembly advantages underutilized space of existing fascia panel pockets to afford additional switches within a vehicle passenger compartment operable to activate or deactivate each of a corresponding plurality of circuits of retrofit vehicle accessory devices.

Another broad object of the invention can be to provide a method of retrofitting a fascia panel of a vehicle with a switch assembly including one or more of: removing a fascia panel having a fascia panel pocket defining a fascia panel pocket interior space open to the fascia panel, inserting a switch assembly within the fascia panel pocket to dispose one or more switches operably supported a switch housing operably accessible to a user within a vehicle passenger compartment, securing the switch assembly in the fascia panel pocket by interaction of at least one switch housing securement feature with the fascia panel pocket.

Naturally, further objects of the invention are disclosed throughout other areas of the specification, drawings, photographs, and claims.

III. BRIEF DESCRIPTION OF THE DRAWINGS

FIG. 1A is an illustration depicting a particular embodiment of an inventive switch system utilized in a vehicle.

Figure 9:
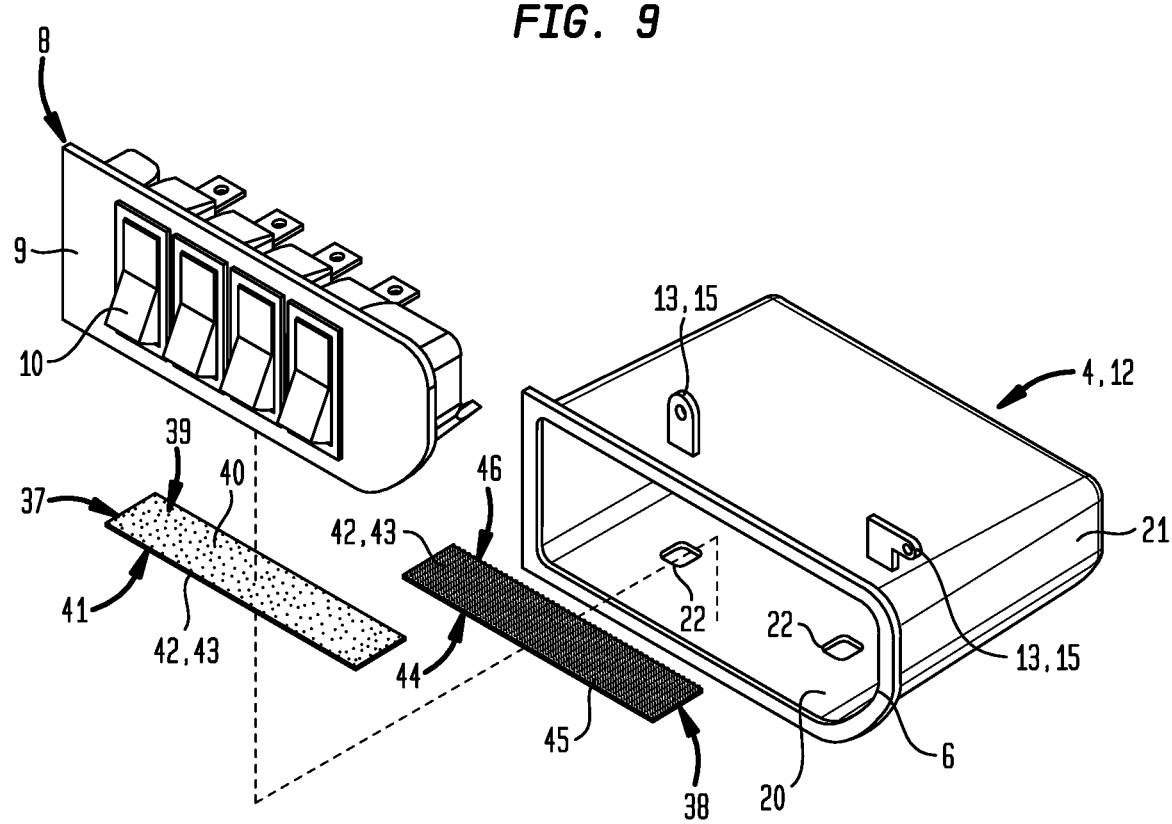

FIG. 9 is an exploded front elevation view of a particular embodiment of a switch assembly insertable in a fascia panel pocket and further including first and second adherent members each having a first side correspondingly adherable to the switch housing external surface and the fascia panel pocket internal surface and each having a second side including one of a loop material or a hook material whereby the second sides can be engaged to secure the switch assembly in the fascia panel pocket.

Figure 10:
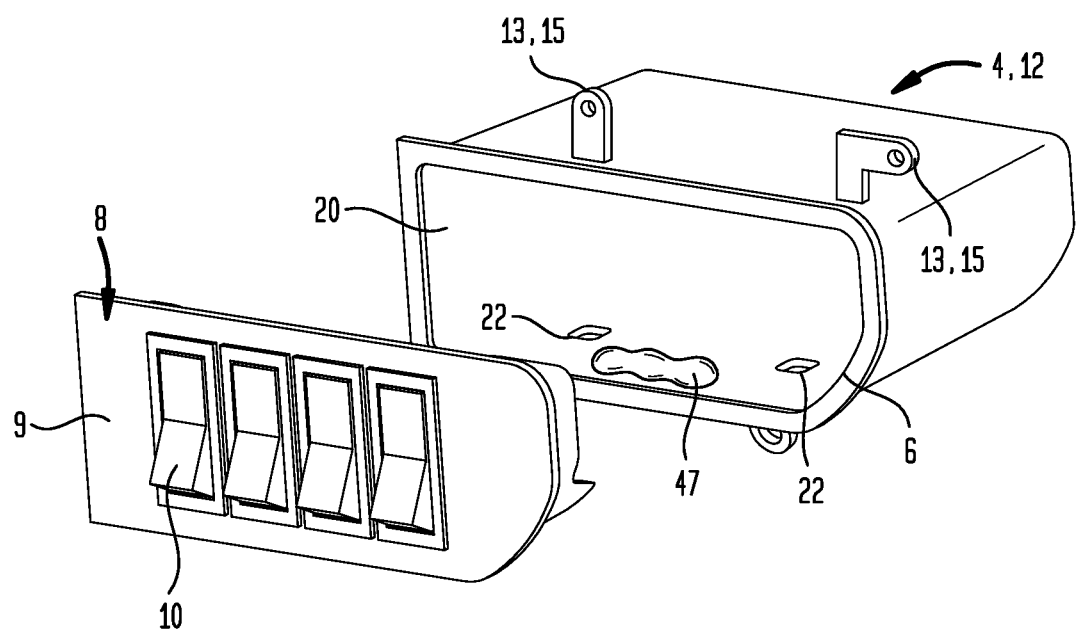

FIG. 10 is an exploded front elevation view of particular embodiment of a switch assembly insertable in a particular embodiment of a fascia panel pocket and further including an amount of adhesive disposed on the switch housing external surface or the fascial panel pocket internal surface to secure the switch assembly in the fascia panel pocket.

Figure 11:
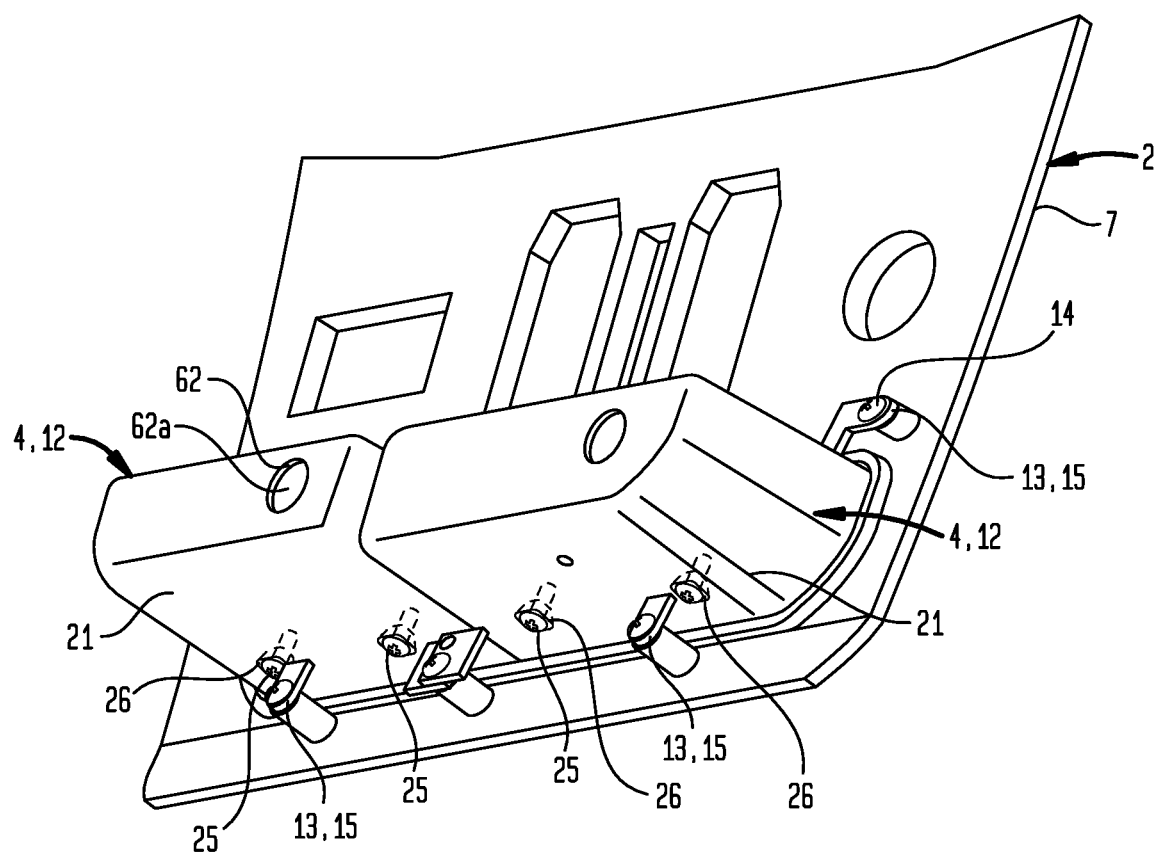

FIG. 11 is an illustration of a retrofit fascia panel pocket having a feedhole mounted to a fascial panel.

Figure 12:
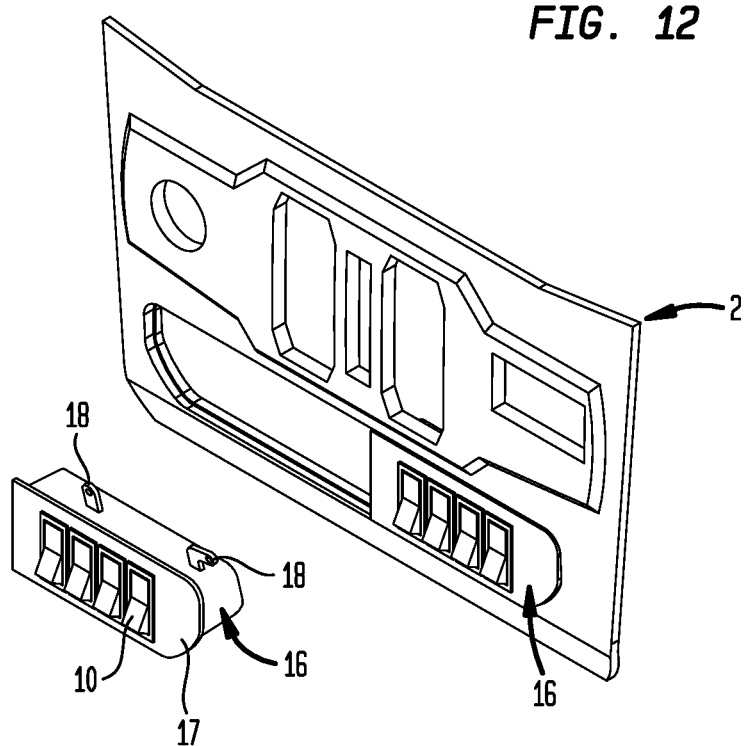

FIG. 12 is an illustration of a retrofit switch assembly for replacement of a conventional fascia panel pocket of a fascia panel.

Figure 13:
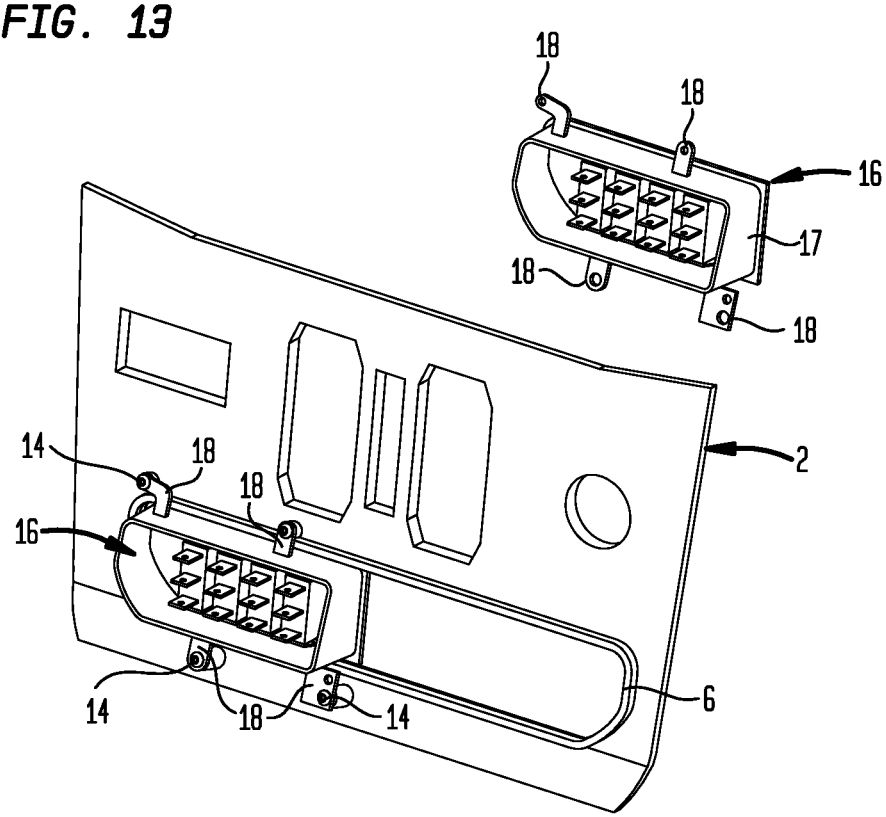

FIG. 13 is an illustration of the retrofit switch assembly shown in FIG. 13 secured to a conventional fascia panel.

IV. DETAILED DESCRIPTION OF THE INVENTION

Generally, FIGS. 1A-1D and 2 through 13, illustrate particular embodiments of a switch system (1), methods of making the switch system (1), methods of using the switch system (1), and in particular embodiments, a kit for retrofitting a fascia panel (2) of a vehicle (3) with the switch system (1).

For the purpose of this invention the term "vehicle (3)" broadly encompasses any vehicle (3) for transporting persons or goods, and without sacrificing the breadth of the forgoing, includes as illustrative examples, trains, planes, trucks, cars, or carts or combinations thereof.

For the purpose of this invention the term "fascia panel (2)" means a body panel of a vehicle (3), whether an existing component or retrofitted to a vehicle (3), and without sacrificing the breadth of the forgoing, includes as illustrative examples: dash panels, dash covers, dash boards, dash inserts, dash faceplates, dash housings, instrument panel housings, instrument bezel covers, dash tops, center dash panels, air conditioning insert panels, heater insert panels, gauge cluster panels, dash shells, dash pad shells, instrument panel moldings, dash panel moldings, or combinations thereof.

For the purposes of this invention, the term "fascia panel pocket (4)" means a compartment disposed in a fascia panel (2) defining an enclosed fascia panel pocket interior space (5) having a fascia panel pocket opening (6) at the fascial panel external surface (7).

Figure 1B:
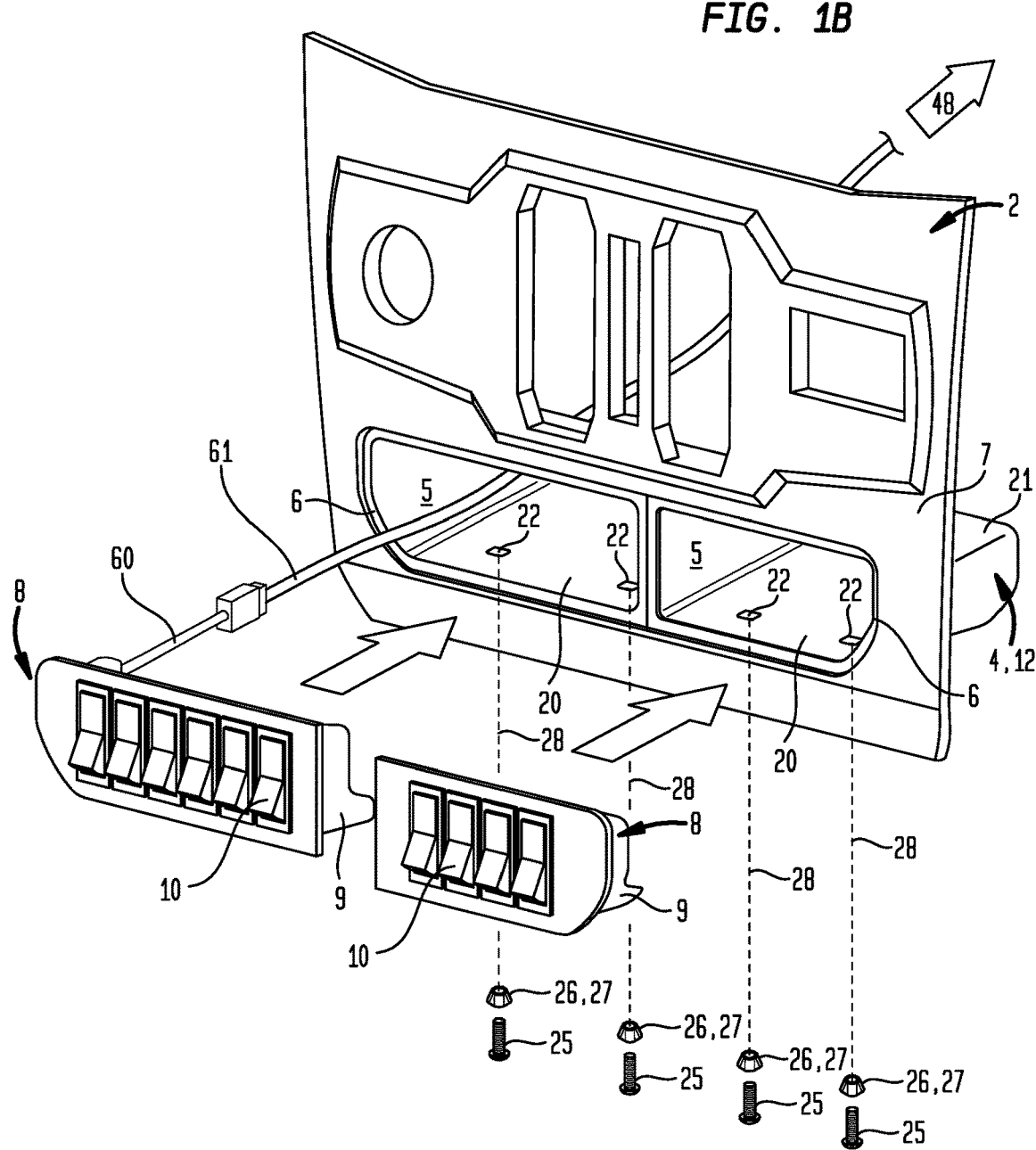
FIG. 1B is an enlarged portion of FIG. 1A depicting an embodiment of a switch assembly of the switch system securable in a fascia panel pocket of a fascia panel of the vehicle.
Figure 1C:
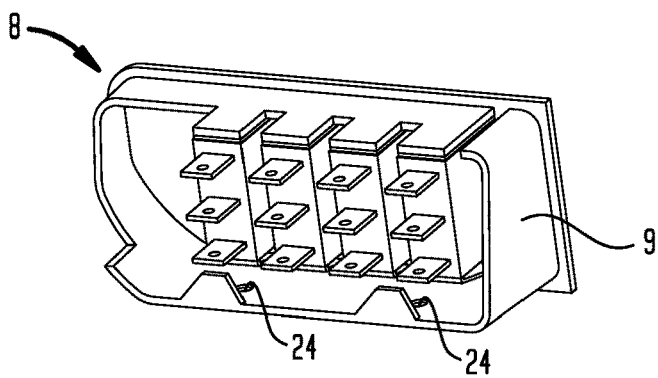
FIG. 1C is a rear perspective view of the switch assembly shown in FIG. 1C having a switch housing including at least one threaded bore configured to threadingly receive a corresponding threaded fastener as depicted in FIG. 1C.
Figure 1D:
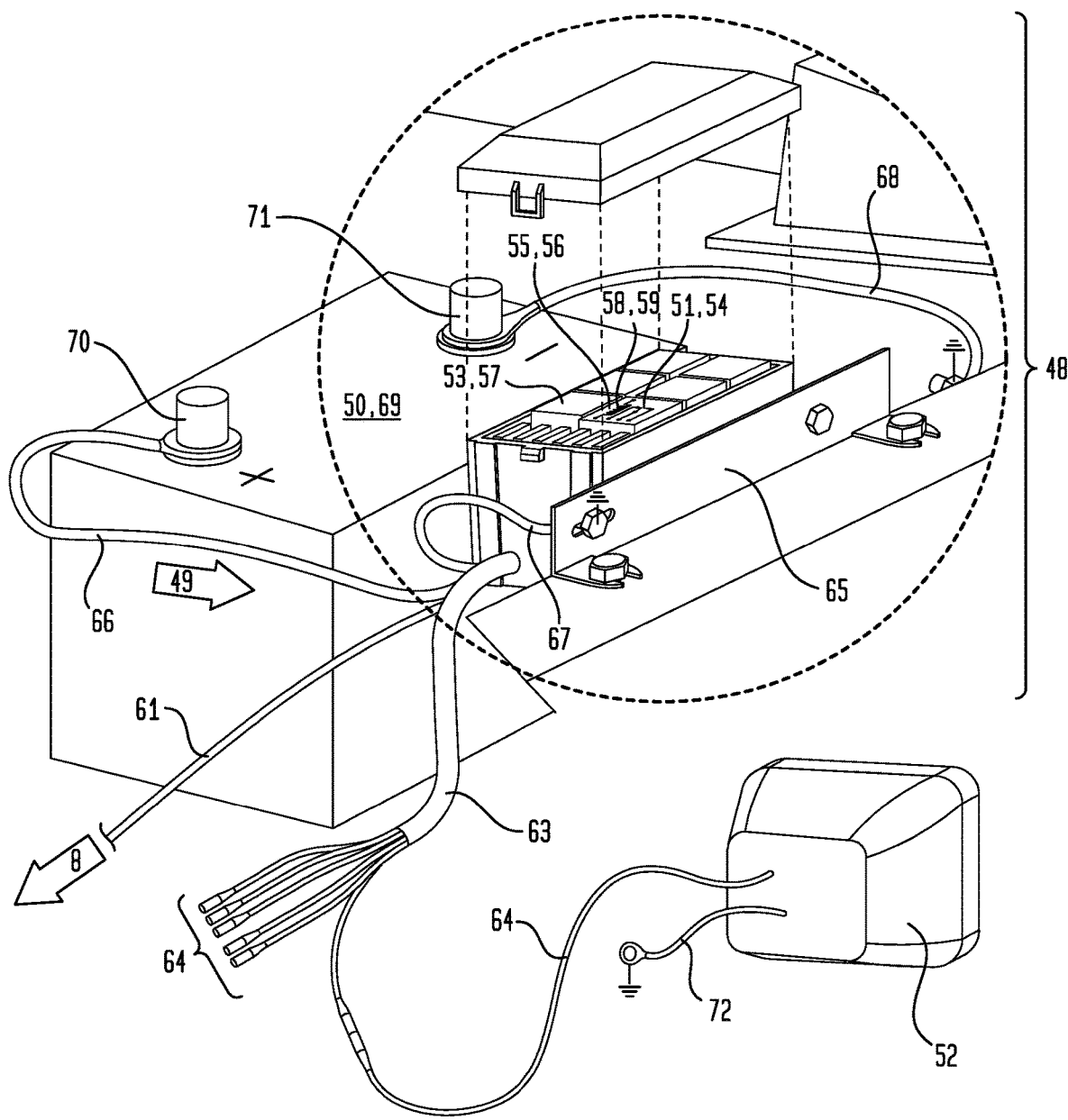
FIG. 1D is an enlarged portion of FIG. 1A depicting an embodiment of a power distribution module of the switch system utilized in the vehicle.

Now with primary reference to FIGS. 1A through 1D, particular embodiments of the switch system (1) can include a switch assembly (8) including a switch housing (9) operably supporting at least one switch (10)(as shown in the examples of FIGS. 1A, 1B and 1C) and a power distribution module (48) (as shown in the example of FIGS. 1A and 1D).

For the purposes of this invention, the term "switch (10)" broadly encompasses any device for making and breaking the electrical flow in an electric circuit, and without sacrificing the breadth of the forgoing, includes as illustrative examples, a mechanical switch or an electrical switch each of which can comprise a single pole single throw switch, a single pole double pole switch, double pole single throw switch, a double pole double throw switch, or intermediate switch each of which can operate as a latch switch or a momentary switch and can be configured as a push button switch, a limit switch, a pressure switch, a float switch, a temperature switch, a toggle switch, a rotary switch or a joy stick switch; and while the Figures illustrate a mechanical switch in the form of a toggle switch having a visible configuration of a rocker switch which typically affords a single pole single throw switch; this is not intended to preclude embodiments in which the switch housing (9) operably supports a plurality of switches (10) having the same or different switch types or switch configurations whether visible or concealed. Additionally, while the illustrative embodiments of the switch assembly (8) depicted in the Figures, include a switch housing (9) which operably supports four switches or six switches (10), this is not intended to preclude a plurality of switches (10) operably supported in the switch housing (9) including or consisting of: two switches, three switches, four switches, five switches, six switches, seven switches, eight switches, nine switches, ten switches, eleven switches or twelve switches, or even a greater number of switches (10).

Figure 4:
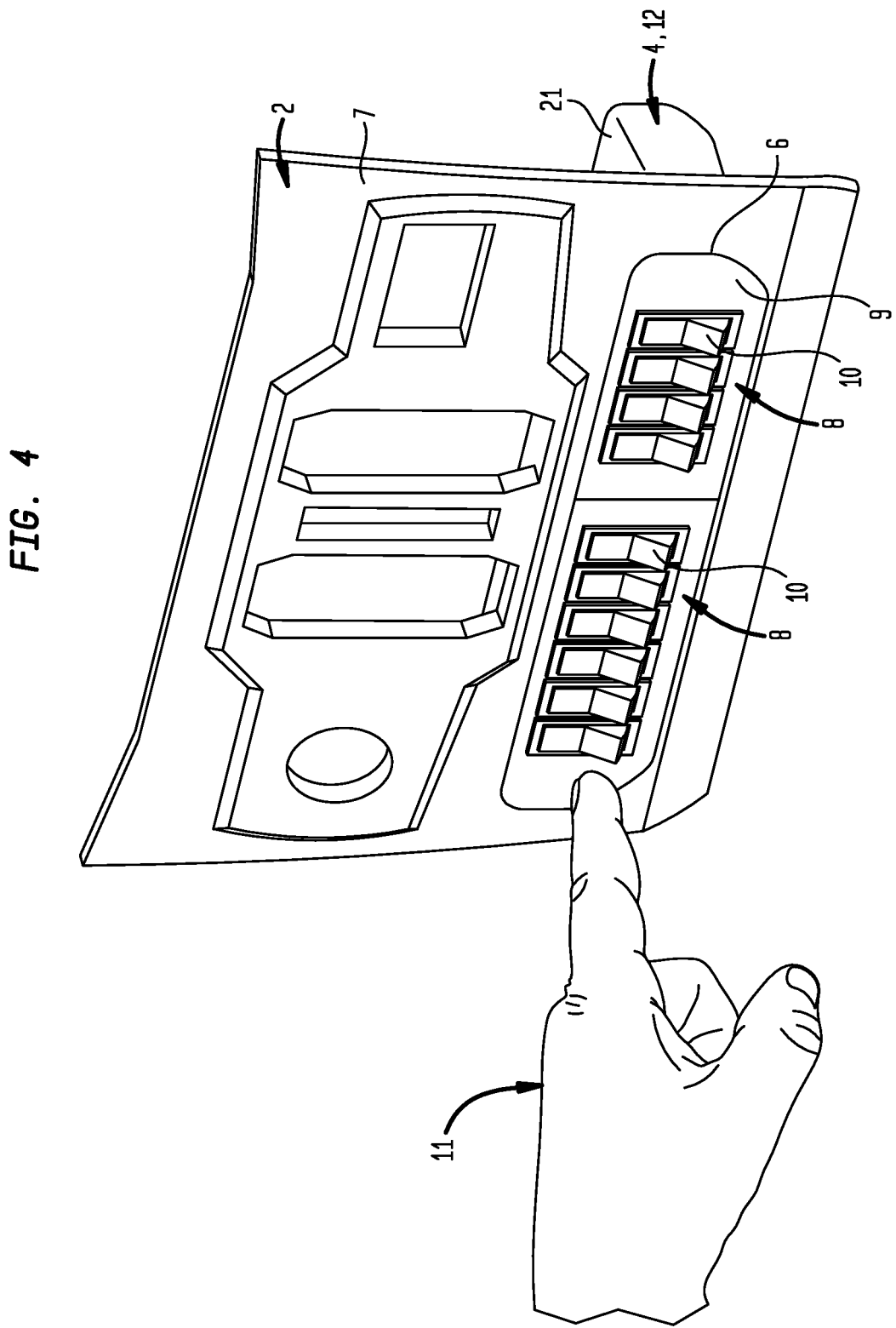
FIG. 4 is an illustration of a method of operating one or more switches operably supported in a switch housing of a switch assembly secured within a fascial pocket of a fascia panel.

Now, with reference to FIGS. 1A through 1C, in particular embodiments, the switch assembly (8) can be configured to insert within a fascia panel pocket (4) disposed in a fascia panel (2) to dispose the switches (10) operably supported in the switch housing (9) operably accessible by a user (11) (as shown in the example of FIG. 4). Depending on the application, the fascia panel pocket (4) can include an fascia panel pocket opening (6) and a fascia panel pocket interior space (5) which can vary in dimension and in which embodiments of the switch assembly (8) can be correspondingly dimensionally configured to be insertingly received within the fascia panel pocket (4); and while the Figures depict a pair of generally rectangular fascia panel pockets (4); this is not intended to preclude fascia panels (2) including or retrofitted with one or a plurality of similar or dissimilar fascia panel pockets (4) which correspondingly accept one or a plurality of similar or dissimilar configurations of switch assemblies (8).

Figure 2:
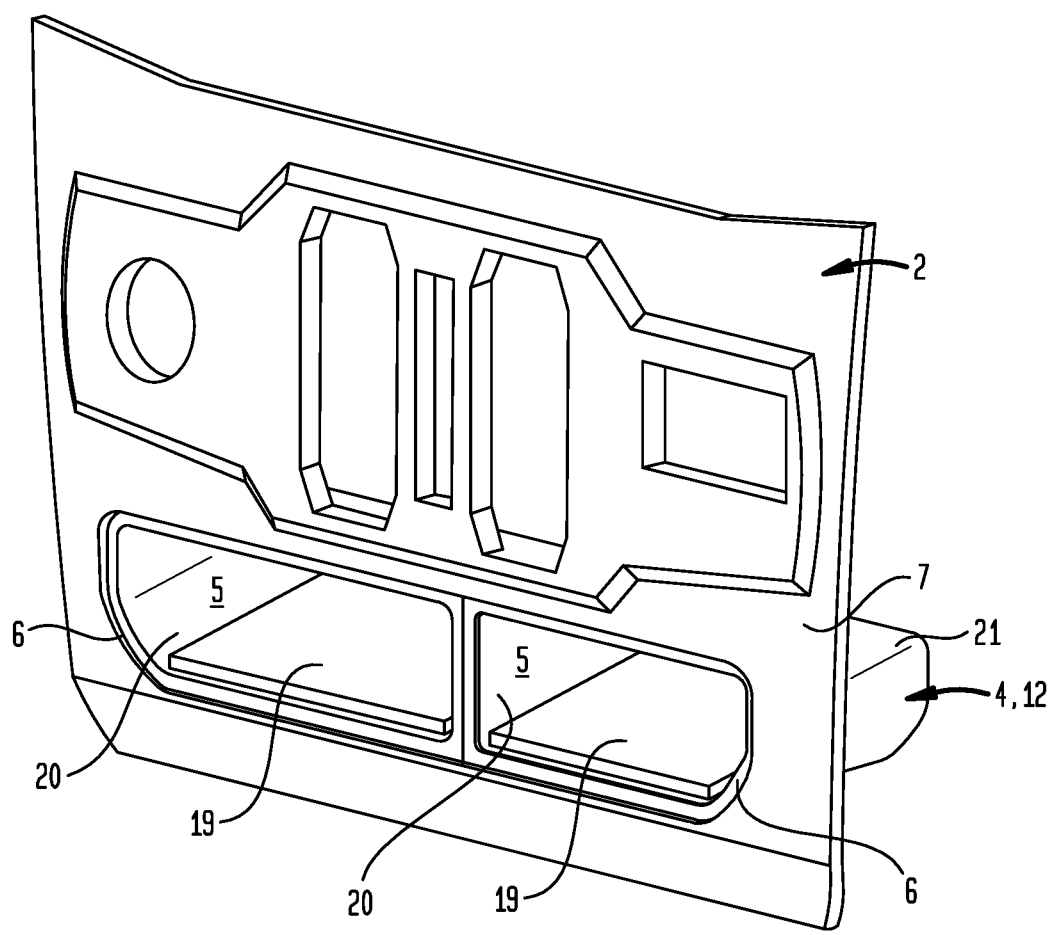
FIG. 2 is an illustration of a conventional vehicle fascial panel having one or more fascia panel pockets including a pocket overlay element.

Now, with primary reference to FIG. 2, in particular embodiments, existing fascia panel pockets (4) secured to or disposed in an existing fascia panel (2) can receive a switch assembly (8) configured to insert within the existing fascia panel pocket (4) with the switches (10) operably accessible by a user (11). As shown in the illustrative example of FIG. 2, in particular applications, the existing fascia panel pocket (4) may, but need not necessarily, include a pocket overlay element (19) configured to overlay or inlay, in whole or in part, a fascia panel pocket internal surface (20) and without sacrificing the breadth of the foregoing, illustrative examples include: a piece or layer of material whether of woven threads, strips or other woven elements, or unwoven such as an elastomeric layer, an elastomeric mat; or a receptacle, container, a tray, or combinations thereof.

Figure 3:
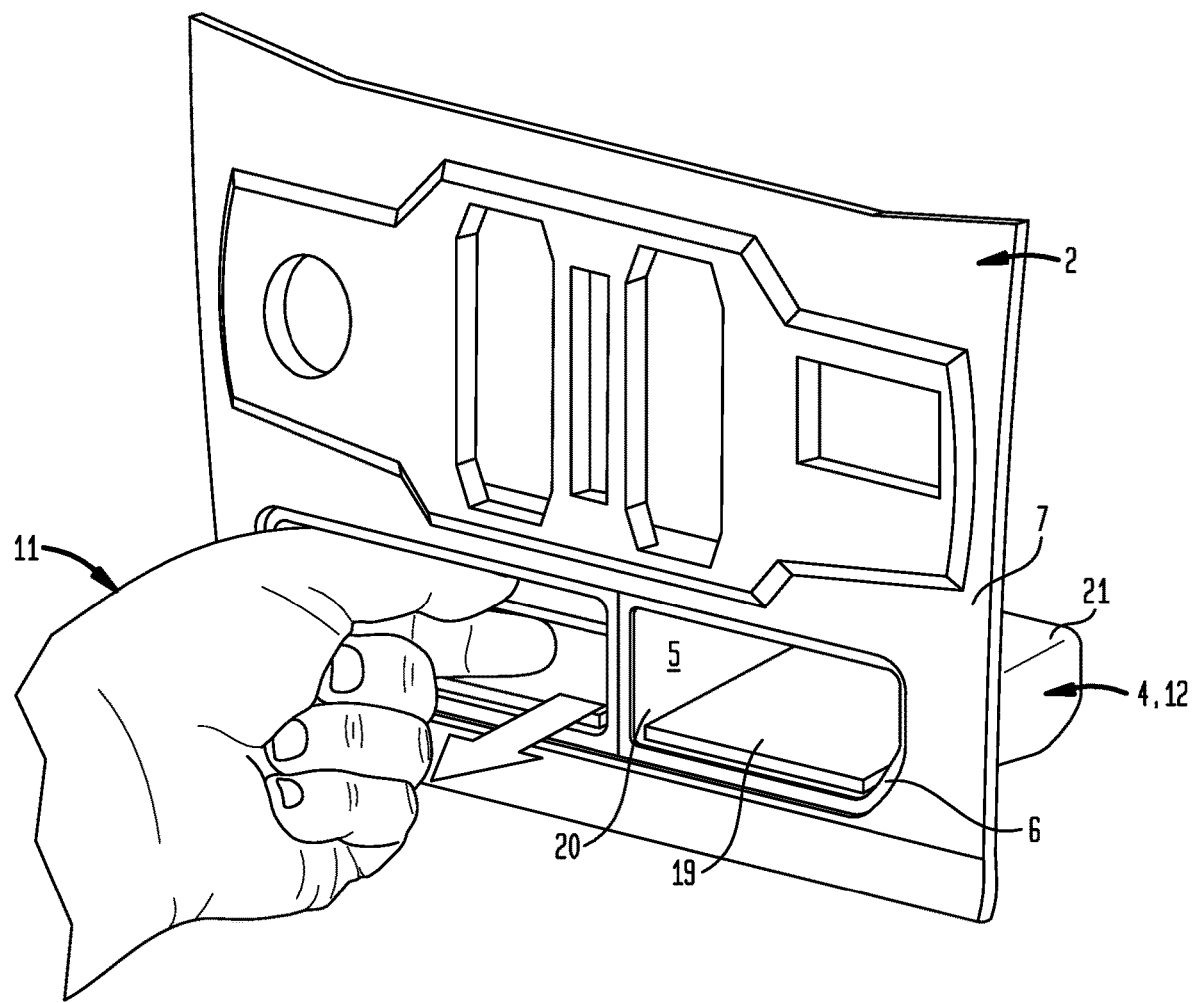
FIG. 3 is an illustration of a method of removing a pocket overlay element from a conventional fascia panel pocket.

Now, with reference to FIGS. 3, in particular embodiments, the pocket overlay element (19) can be removed from the fascia panel pocket (4) (as shown in the example of FIG. 3) to expose the overlaid fascia panel pocket internal surface (20) (as shown in the example of FIG. 1B). In particular configurations, the fascia panel pocket (4) or a retrofit fascia panel pocket (12) (as shown in the example of FIG. 11) can, but need not necessarily, include an aperture element (22) open between a fascia panel pocket internal surface (20) and a fascia panel pocket external surface (21) of the fascia panel pocket (4). In the illustrative examples of FIGS. 1A and 1B and 4 through 10, the fascia panel pocket (4) includes a pair of aperture elements (22); however, this is not intended to preclude embodiments of the fascial panel pocket (4) or the retrofit fascia panel pocket (12) which do not include any aperture element (22) or can include only one aperture element (22) or can include a plurality of aperture elements (22) having numerosity greater than a pair of aperture elements (22).

Now, with primary reference to FIG. 4, the switch assembly (8) can be inserted into and secured within the existing fascia panel pocket (4) of the fascia panel (2) with the switches (10) operably accessible by a user (11). The user (11) can interact with one or more switches (10) to activate or deactivate one or more vehicle accessory devices (52).

Now, with general reference to FIGS. 1B and 1C and 5 through 7, in particular embodiments, the switch assembly (8) can, but need not necessarily, include a switch housing (9) having a switch housing securement feature (23) configured upon insertion of the switch assembly (8) within the fascia panel pocket interior space (5) to align with one or more of the aperture element(s) (22) disposed in the fascia panel pocket (4). The switch housing securement feature (23) upon alignment with one or more of the aperture element(s) (22) disposed in the fascia panel pocket (4) can be utilized to secure the switch assembly (8) within the fascial panel pocket interior space (5).

Now, with primary reference to FIGS. 1A, 1B and 1C, in particular embodiments, at least one threaded bore (24) can be disposed in the switch housing (9) of the switch assembly (8) which upon insertion of the switch assembly (8) within the fascia panel pocket (4) can be aligned with one or more of the aperture element(s) (2) disposed in the fascial panel pocket (4). A threaded fastener (25) adapted to rotatably engage the threaded bore (24) disposed in the switch housing (9) can pass through the aperture element (22) disposed in the fascia panel pocket (4) and threadingly engage the threaded bore (24) disposed in the switch housing (9) to secure the switch assembly (8) within the fascia panel pocket interior space (5) with the switches operably accessible by a user (11).

Again, with primary reference to FIG. 1B, in particular embodiments, the securement feature (23) can further include a compression element (26) having a tapered external surface (27) adapted to slidably compressingly engage the aperture element (22) disposed in the fascia panel pocket (4) upon rotatably engaging the threaded fastener (25) with the corresponding threaded bore (24) disposed in the switch housing (9). The compression element (26) can act to provide an interference fit between the threaded fastener (25) and the aperture (22) in the fascia panel pocket (4) or can urge the threaded fastener (25) toward a central axis (28) of the aperture element (22) disposed in the fascia panel pocket (4) to correspondingly position the switch assembly (8) within the fascia panel pocket interior space (5).

Figure 5:
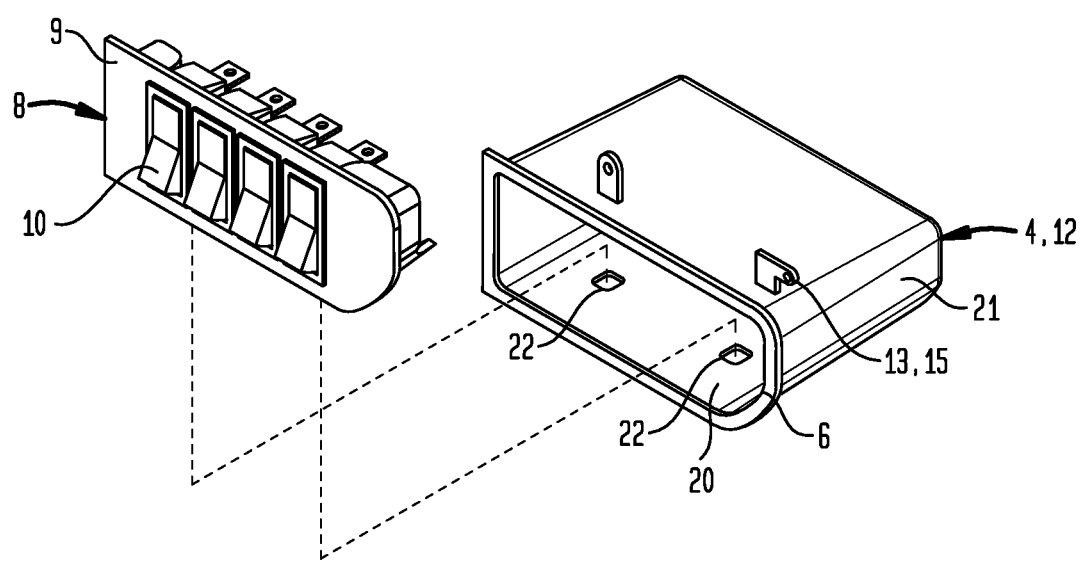
FIG. 5 is an exploded elevation view of particular embodiment of a switch assembly having at least one protuberance disposed on the switch housing.
Figure 6:
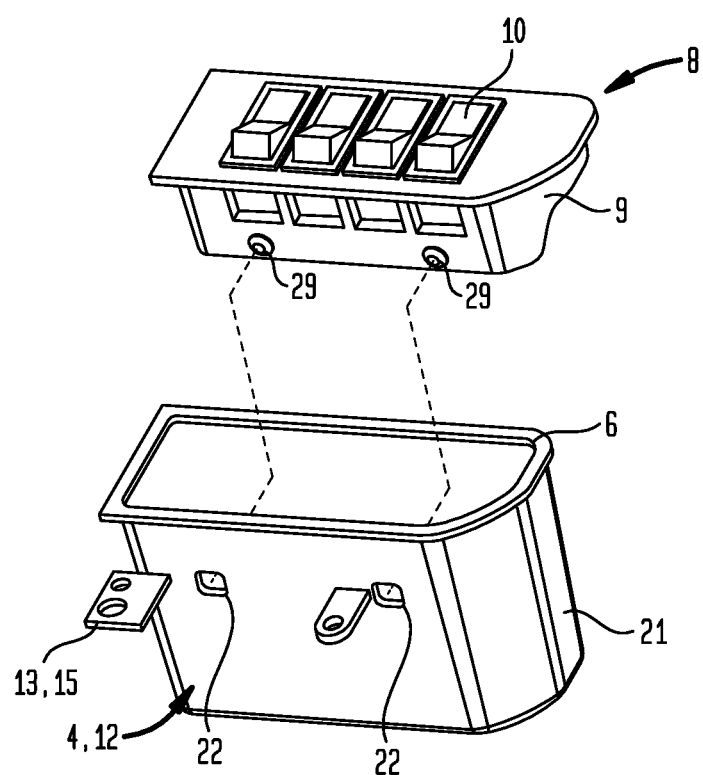
FIG. 6 is an exploded elevation view of particular embodiment of a switch assembly having at least one protuberance disposed on the switch housing.
Figure 7:
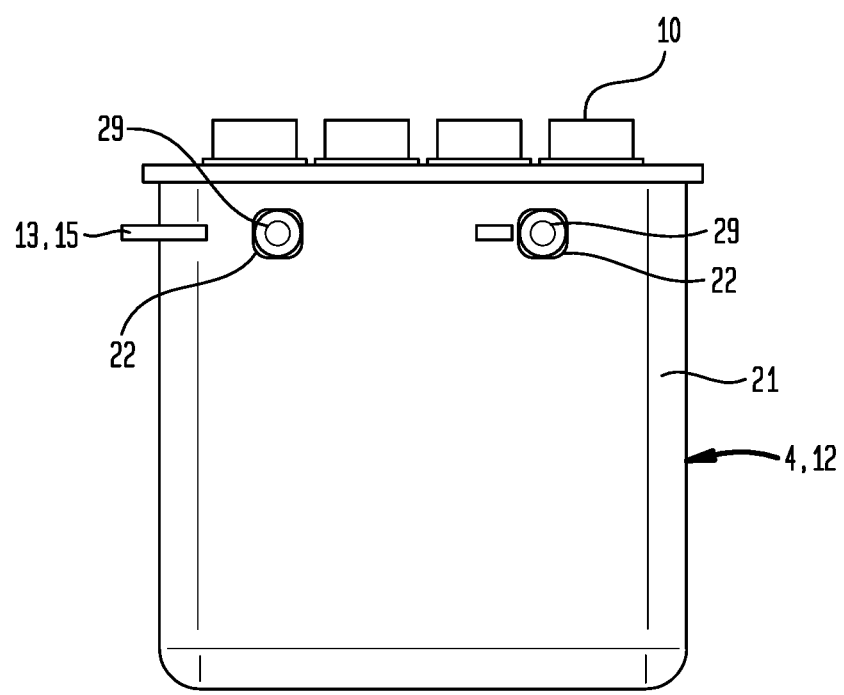
FIG. 7 is plan view of the particular embodiment of a switch assembly shown in FIGS. 5 and 6 inserted in a fascia panel pocket having at least one protuberance of the switch housing mateably engaged with at least one aperture of the fascia panel pocket to secure the switch assembly in the fascia panel pocket.

Now, with reference to FIGS. 5 through 7, in particular embodiments, the switch housing securement feature (23) can, but need not necessarily, comprise a protuberance (29) disposed on the switch housing (9) configured to align with the aperture element (22) disposed in the fascia panel pocket (4) upon insertion of said switch assembly (8) within the fascia panel pocket interior space (5). The protuberance (29) disposed in the aperture element (22) of the fascia panel pocket (4) can secure the switch assembly (8) within the fascia panel pocket interior space (5).

For the purposes of this invention the term "protuberance" means any structure that protrudes from the switch housing (9) adapted to mateably engage a corresponding aperture element (22) or recess in the fascia panel pocket (4), and without sacrificing the breadth of the foregoing, includes as illustrative examples: a torsional snap fit in which one of, or a combination of, the fascia panel pocket (4), the switch housing (9), or protuberance (29) deflects or deforms to allow the switch assembly (8) to slidingly insert into the fascia panel pocket interior space (5), and upon alignment of the protuberance (29) with the aperture element (22) or recess, returns toward the undeflected or undeformed condition to dispose the protuberance (29) in the aperture element (22); a cantilever snap fit in which the protuberance (29) can be resiliently depressible in relation to the switch housing (9) by operation of a hinge element, a living hinge, spring plate, spring, or other resilient reaction element adapted to allow the protuberance (29) to be depressed in relation to the switch housing (9) and return toward the undepressed condition to dispose the protuberance (29) in the aperture element (22); a annular snap fit in which the circumference of the aperture element (22) expands or deflects to allow insertion of the protuberance (29) upon which the aperture element (22) returns toward the unexpanded or undeflected condition to secure the protuberance (29).

While FIGS. 5 through 7, do not depict the fascia panel (2) as shown in the example of FIGS. 1A and 1B, embodiments can be utilized with a fascia panel pocket (4) originally secured to a fascia panel (2) or with a retrofit fascia panel pocket (12) secured to a fascia panel (2). Additionally, while embodiments depicted in FIGS. 7 through 9 include a pair of protuberances (29) disposed to be correspondingly disposed in a pair of aperture elements (22), this is not intended to preclude embodiments which include only one protuberance (29) disposed to align with only one aperture element (22) or only one of a plurality of aperture elements (22), or a plurality of protuberances (29) greater than two protuberances (29) each disposed to correspondingly align with one of a plurality of apertures (22).

Figure 8:
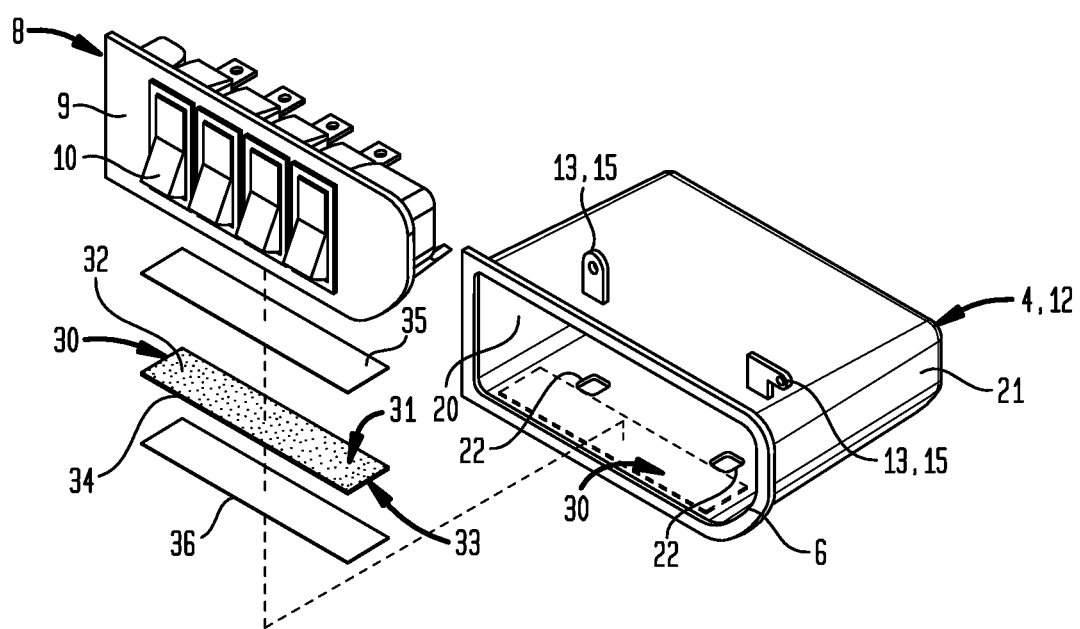
FIG. 8 is an exploded elevation view of a particular embodiment of a switch assembly insertable in a fascia panel pocket and further including at least one adherent member disposed between the switch housing external surface and the fascia panel pocket internal surface to secure the switch assembly in the fascia panel pocket.

Now, with primary reference to FIG. 8, in particular embodiments, the switch housing securement feature (23) can, but need not necessarily, comprise an adherent member (30) including an adherent member first side (31) having a first adhesive coating (32) adapted to adhere to the switch housing (9) opposite an adherent member second side (33) having a second adhesive coating (34) adapted to adhere to the fascia panel pocket internal surface (20). Embodiments can, but need not necessarily, further include first and second adherent protective layers (35)(36) peelably coupled to the first and second adherent layers (32)(34). The first and second adherent protective layers (35)(36) can be peelably removed to expose the first and second adherent layers (32)(34).

The term "adherent member (30)" broadly encompasses any substrate which can retain an adhesive coating whether comprised of a woven substrate such as, polypropylene fibers, polyethylene fibers or polyester fibers, or srim; or a nonwoven substrate such as, film-forming polymers such as vinyl polymers, regenerated celluloses, latex polymers, acrylic polymers, polyvinylacetate phthalate, or kraft paper or hemp; or polymeric foam such as low density polyethylene, polyimide, polystyrene, polypropylene, polyethylene, polyvinylchloride, silicon, and combinations thereof.

The term "adhesive coating (32)(34)" broadly encompasses any substance which can be applied to the adherent member (30) and by subsequent engagement binds the adherent member (30) to the switch housing (9) or the fascia pocket internal surface (20), and as illustrative examples: pressure sensitive adhesives such as acrylic elastomers, butyl rubbers, natural rubbers, nitriles, silicone rubbers, latex rubbers, styrene block polymers, polyamides, and urethanes, or combinations thereof.

Regardless, as to whether the fascia panel pocket (4) includes one or more aperture elements (22), the adherent member (30) can be first adhered to either of the switch housing (9) or the fascia panel pocket internal surface (20). The switch assembly (8) can be inserted into the fascial panel pocket (4) and sufficient pressure applied to the switch assembly (8) or the fascial panel pocket (4) to adhere the adherent member (30) to the remaining one of the switch housing (9) or the fascia panel pocket internal surface (20). Depending upon the adhesive coating (32)(34) the switch assembly (8) can, but need not necessarily, by forcible urging be removed from the fascia panel pocket (4).

Now, with reference to FIG. 9, in particular embodiments, the switch housing securement feature (23) can, but need not necessarily, comprise a pair of adherent members (37) (38). The first of the pair of adherent members (37) can include a first adherent member first side (39) having a first adherent member adhesive coating (40) adapted to adhere to the switch housing (9) opposite a first adherent member second side (41) having a loop material (42) or a hook material (43). The second of the pair of adherent members (38) can include a second adherent member first side (44) having a second adherent member adhesive coating (45) adapted to adhere to the fascia panel pocket internal surface (20) opposite a second adherent member second side (46) having a loop material (42) or a hook material (43).

The term "adhesive coating (40)(45)" has the meaning set forth above for adhesive coating (32)(34).

The term "loop material (42)" broadly encompasses a backing material and spunbond web attached to the backing material. The spunbond web contains a plurality of spunbond fibers or filaments formed to define a plurality of intertwined loop springs.

The term "hook material (43)" broadly encompasses a base layer including a plurality of hook members outwardly extending from the base layer and have configuration to releasably attach to the loop material (42).

As an illustrative example, a loop material (42) and a hook material (43) may be obtained from Velcro®, USA of Manchester, N.H.

Regardless, as to whether the fascia panel pocket (4) includes one or more aperture elements (22), the first adherent member adhesive coating (40) of the first adherent member (37) can be adhered to the switch housing (9), and the second adherent member adhesive coating (45) of the second adherent member (38) can be adhered to the fascia panel pocket internal surface (20), and the hook material (43) or the loop material (42) of the first adherent member (37) can be engaged to the corresponding hook material (43) or loop material (42) of the second adherent member (38) to secure the switch assembly (8) within the fascia panel pocket interior space (5).

Now, with reference to FIG. 10, in particular embodiments, the switch housing securement feature (23) can, but need not necessarily, comprise an amount of adhesive (47) disposed on the switch housing (9) or on the fascia pocket internal surface (20). The term "adhesive (47)" broadly encompasses any substance that can be disposed on the switch housing (9) or on the fascia pocket internal surface (20) to adhere the switch housing (8) to the fascial pocket internal surface (20), and without sacrificing the breadth of the foregoing, illustrative examples include: natural or synthetic rubbers, polychloroprenes, polyester resin, polyols, acrylic polymers, polyurethanes, cyanoacrylates, silicone, phenolics, polyimides, polyvinyl acetate, along with plastic solvents such as chloroform, acetone, or combinations thereof.

Regardless, as to whether the fascia panel pocket (4) includes one or more aperture elements (22), an amount of adhesive (47) can be disposed on the switch housing (8) or on the fascial pocket internal surface (20) and switch assembly (8) can be disposed in the fascia panel pocket (4) and the adhesive (47) upon curing can secure the switch assembly (8) within the fascia panel pocket interior space (5).

Now, with reference to FIG. 11, in particular embodiments, the existing fascia panel pocket (4) secured to the fascia panel (2) can be removed and replaced with a retrofit fascia panel pocket (12) configured to receive a particular configuration switch assembly (8). With reference to FIG. 6, in particular embodiments, the existing fascia panel pocket (4) can include a plurality of outwardly extending pocket tabs (13) secured by mechanical fasteners (14) to the fascia panel (2). Removal of the mechanical fasteners (14) allows removal of the existing fascia panel pocket (4) from the fascia panel (2) and replacement with the retrofit fascia panel pocket (12). The retrofit fascia panel pocket (12) can include retrofit pocket tabs (15) which receive the mechanical fasteners (14) to affix the retrofit fascia panel pocket (12) to the existing fascia panel (2). While the example of FIG. 6, depicts outwardly extending pocket tabs (13) which receive mechanical fasteners (14) to secure the existing fascia panel pocket (4) to the existing fascia panel (2); this is not intended to preclude embodiments in which the the existing fascial panel pocket (4) and the retrofit fascia panel pocket (12) secure to the existing fascia panel (2) by other attachment features such as snap-fit features, including cantilever, torsional or annular snap-fit features; or by press fit, friction fit or interference fit; or by use of adherent or adhesive.

Now, with reference to FIGS. 12 and 13, in particular embodiments, the existing fascia panel pocket (4) secured to the fascia panel (2) can be removed and a retrofit switch assembly (16) having configuration securable to the fascia panel (2) can be installed without the use of the fascia panel pocket (4). Again, the existing fascia panel pocket (4) can include a plurality of outwardly extending pocket tabs (13) secured by mechanical fasteners (14) to the fascia panel (2). Removal of the mechanical fasteners (14) allows removal of the existing fascia panel pocket (4) from the fascia panel (2). The retrofit switch assembly (16) can in include a retrofit switch housing (17) which includes outwardly extending retrofit switch housing tabs (15) which receive the mechanical fasteners (14) to affix the retrofit switch assembly (16) to the existing fascia panel (2). Again, while the example of FIGS. and 13, depicts outwardly extending retrofit switch housing tabs (15) which receive mechanical fasteners (14) to secure the retrofit switch assembly (16) to the existing fascia panel (2); this is not intended to preclude embodiments in which the existing fascial panel pocket (4) and the retrofit switch assembly (16) secure to the existing fascia panel (2) by other attachment features such as snap-fit features, including cantilever, torsional or annular snap-fit features; or by press fit, friction fit or interference fit; or by use of adherent or adhesive.

Again, with reference to FIGS. 1A through 1D, particular embodiments of the switch system (1) can include an electrical power distribution module (48) (also referred as "electrical power distribution circuitry") configured to switchably regulate electrical power (49) from a power source (50) to each one of a plurality of output circuits (51), each of the plurality of output circuits (51) correspondingly switchably controlled by operation of one of the plurality of switches (10) operably supported in the switch housing (9) of the switch assembly (8) disposed within the fascia panel pocket interior space (5) of the fascia panel pocket (4) of a fascia panel (2) to correspondingly activate or deactivate one of a plurality of accessory devices (52).

In the illustrative example of FIGS. 1A through 1D, the electrical power distribution module (48) includes one or a plurality of relays (53). The plurality of relays (53) can, but need not necessarily, comprise an electrically operated plurality of relay output switches (54) each correspondingly switchably regulating electrical power (49) from one or more power sources (50) in a corresponding one or a plurality of relay output circuits (51). Each one of the plurality of relay output switches (54) can be actuated by a corresponding relay switch actuator (55) within a corresponding relay input circuits (56) which can be activated or deactivated by operation of a corresponding one of the plurality of switches (10) operably supported in the switch housing (9), which as above described can, but need not necessarily, be disposed within the fascia panel pocket interior space (5) of the fascia panel pocket (4) of a fascia panel (2). While the plurality relays (53), will typically comprise a magnetic relay (57) in which the relay output switch (54) mechanically operates in response to relay switch actuator (55) in the form of a coil (58) which generates an electromagnetic field (59) to correspondingly close a relay output circuit (51). An illustrative example of a magnetic relay suitable for use in embodiments of the invention can be an Omron® Power Relay Product No. G8JN-1C7T-DC 12, or similar magnetic relay. However, the description of a magnetic relay (57) is not intended to preclude use of other types of relays such as solid state relays, reed relays, static relay, timed delay relay, or combinations thereof.

Again, with reference to FIGS. 1A through 1D, embodiments can further include a switch wiring harness (60) including a plurality of relay power input wires (61) each connected to one relay switch actuator (55) and connectable to a corresponding one of the plurality of switches (10) operably supported in the switch housing (8) of the switch assembly (8) which can, but need not necessarily, be disposed within the fascia panel pocket interior space (5) of a fascia panel pocket (4) of a fascia panel (2) of a vehicle (3). With reference to FIGS. 1 and 6, a switch wire feed hole (62) can be disposed in the fascia panel pocket (4) or retrofit fascia panel pocket (12) to provide a passthrough (62A) through which the switch wire harness (60) can pass to connect each of the plurality of relay power input wires (61) to a corresponding one of the plurality of switches (10) of the switch assembly (8).

Again, with reference to FIGS. 1A through 1D, embodiments can further include an accessory device wiring harness (63) including a plurality of relay power output wires (64) each correspondingly connected to one of said plurality of relay output switches (54) and connectable to one of a plurality of grounded accessory devices (52). The term "accessory device (52)" broadly encompasses any device which can be switchably connected and disconnected from a power source (50), and as illustrative examples include automotive accessories, such as: auxiliary lamps, floodlamps, spot lamps, rotating beacons, horns, fanfares, bullhorns, electric motors, winches, pumps, fans, radar detectors, radios, speakers, transmitters, receivers, and chargers, or combinations thereof.

Again, with reference to FIGS. 1A through 1D, the electrical power distribution module (48) can be mounted to the steel frame or chassis (65) of a vehicle (3). Embodiments can further include a power source wire (66) connected to the power distribution module (48) and connectable to one or more power sources (50) to provide electrical power (49) to the relay output circuits (51) upon the relay output switch (54) being switchably closed which in turn provides electrical power (49) to the corresponding accessory device (52).

Again, with reference to FIGS. 1A through 1D, embodiments can further include a power distribution module ground wire (67) electrically connected to the plurality of relays (53) and connectable to a ground (68). In the example of a vehicle (3), the power source (50) can be a wet or dry cell battery (69) to which the power source wire (66) can be connected to the positive terminal (70) and the negative terminal (71) can be connected by a power source ground wire (68) to a ground (65) to maintain the positive terminal (70) at the rated voltage. The ground (65) can be the vehicle (3) steel frame or chassis (65). Similarly, each accessory device (52) can have a vehicle accessory ground wire (73) which can use the vehicle steel frame or chassis as ground (65).

As can be easily understood from the foregoing, the basic concepts of the present invention may be embodied in a variety of ways. The invention involves numerous and varied embodiments of a switch system and methods for making and using such switch system including the best mode.

As such, the particular embodiments or elements of the invention disclosed by the description or depicted in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "switch" should be understood to encompass disclosure of the act of "switching"—whether explicitly discussed or not—and, conversely, were there effectively disclosure of the act of "switching", such a disclosure should be understood to encompass disclosure of a "switch" or even a "means for switching." Such alternative terms for each element or step are to be understood to be explicitly included in the description.

In addition, as to each term used, it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the switch systems, kits, or components herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

What is claimed is:

1. A switch system, comprising:
    a fascia panel pocket configured to be disposed adjacent to a fascia panel pocket opening of a vehicle fascia panel, said fascia panel pocket includes:
        a fascia panel pocket internal surface defining a fascia panel pocket interior space,
        at least one tab configured to secure said fascia panel pocket to said fascia panel, said at least one tab extending outwardly from a fascia panel pocket external surface,
        at least one aperture element between said fascia panel pocket internal surface and said fascia panel pocket external surface, and
        a switch wire feed hole configured to allow a switch wire harness to pass between said fascia panel pocket internal surface and said fascia panel external surface; and
    a switch assembly configured to be insert within said fascia panel pocket interior space of said fascia panel pocket, said switch assembly includes a switch housing operably supporting at least one switch, said switch housing having at least one switch housing securement feature configured to secure said switch assembly in said fascia panel pocket,
    wherein said at least one switch housing securement feature aligns with said at least one aperture element of said fascia panel pocket.

2. The switch system of claim 1, wherein each of said at least one switch housing securement feature aligns with a corresponding one of said at least one aperture element of said fascia panel pocket.

3. The switch system of claim 1, wherein said at least one switch housing securement feature comprises:
    at least one threaded bore disposed in said switch housing, said at least one threaded bore alignable with said at least one aperture element disposed in said fascia panel pocket upon inserting said switch assembly in said fascia panel pocket; and
    at least one threaded fastener adapted to pass through said at least one aperture element to rotatably engage said at least one threaded bore disposed in said switch housing to secure said switch assembly in said fascia panel pocket.

4. The switch system of claim 3, wherein said at least one switch housing securement feature further comprising at least one compression element having central bore through which said at least one threaded fastener passes and a tapered external surface adapted to slidably engage said at least one aperture element upon rotatably engaging said at least one threaded fastener with said at least one threaded bore.

5. The switch system of claim 3, wherein said at least one aperture element comprises a pair of aperture elements disposed in spatially fixed relation a distance apart in said fascia panel pocket, and wherein said at least one threaded bore comprises a pair of threaded bores, and wherein said at least one threaded fastener comprises a pair of threaded fasteners each adapted to correspondingly pass through a corresponding one of said pair of aperture elements to rotatably engage a respective one of said pair of threaded bores.

6. The switch system of claim 1, wherein said at least one switch housing securement feature comprises at least one protuberance disposed on said switch housing, said at least one protuberance alignable with said at least one aperture element disposed in said fascia panel pocket upon inserting said switch assembly within said fascia panel pocket interior space, wherein said at least one protuberance disposed in said at least one aperture element secures said switch assembly in said fascia panel pocket.

7. The switch system of claim 6, wherein said at least one aperture element comprises a pair of aperture elements disposed in spatially fixed relation a distance apart in said fascia panel pocket, and wherein said at least protuberance comprises a pair of protuberances corresponding disposed on said switch housing to engage said pair of aperture elements.

8. The switch system of claim 1, wherein said at least one switch housing securement feature comprises an adherent member including a first side having an adhesive coating adapted to adhere to said switch housing opposite a second side having an adhesive coating adapted to adhere to said fascia panel pocket internal surface.

9. The switch system of claim 8, wherein said first side of said adherent member adhered to said switch housing, and said second side of said adherent member adhered to said fascia panel pocket internal surface secures said switch assembly in said fascia panel pocket.

10. The switch system of claim 1, wherein said at least one switch housing securement feature comprises a pair adherent members, wherein a first of said pair of adherent members including a first adherent member first side having an adhesive coating adapted to adhere to said switch housing opposite a first adherent member second side having one of a hook material or a loop material, wherein a second of said pair of adherent members including a second adherent member first side having an adhesive coating adapted to adhere to said fascia panel pocket internal surface opposite a second adherent member second side having another of a hook material or a loop material.

11. The switch system of claim 10, wherein said adhesive coating of said first of said pair of adherent members adhered to said switch housing, and wherein said adhesive coating of said second of said pair of adherent members adhered to said fascia panel pocket internal surface, and wherein said one of said hook material or said loop material of said first of said pair of adherent members engaged to said another of said hook material or said loop material of said second of said pair of adherent members secures said switch assembly in said fascia panel pocket.

12. The switch system of claim 1, wherein said at least one switch housing securement feature comprises an amount of adhesive disposed between said fascia panel pocket internal surface and said switch housing.

13. The switch system of claim 1, wherein said at least one switch comprises a plurality of switches operably supported in said switch housing.

14. The switch system of claim 13, wherein said plurality of switches operably supported in said switch housing selected from a group consisting of: two switches, three switches, four switches, five switches, six switches, seven switches, eight switches, nine switches, ten switches, eleven switches and twelve switches.

15. The switch system of claim 1, further comprising an electrical power distribution module, said electrical power distribution module configured to switchably regulate electrical power from one or more power sources to each one of a plurality of output circuits, each of said plurality of output circuits correspondingly switchably controlled by operation of one of said plurality of switches to correspondingly activate or deactivate one of a plurality of grounded accessory devices.

16. The switch system of claim 15, wherein said plurality of output circuits are a plurality of relay output circuits, and
said electrical power distribution module includes a plurality of magnetic relays each correspondingly switchably regulating one of a plurality of relay output switches to connect or disconnect said electrical power from said one or more power sources in a corresponding one of said plurality of relay output circuits, each of said plurality of relay output switches actuated by a corresponding one of a relay switch actuator within a corresponding relay input circuit activated or deactivated by operation of a corresponding one of said plurality of switches operably supported in said switch housing of said switch assembly.

17. The switch system of claim 16, wherein said electrical power distribution module further includes:
an accessory device wiring harness including a plurality of relay power output wires each correspondingly connected to one of said plurality of relay output switches and connectable to one of said plurality of grounded accessory devices;
said switch wiring harness including a plurality of relay power input wires connected to said relay switch actuator and each connectable to said corresponding one of said plurality of switches operably supported in said switch housing disposed within said fascia panel pocket interior space of said fascia panel pocket; and
a power wire connectable to said one or more power sources; and
a ground wire connectable to a ground.

18. The switch system of claim 17, wherein one or more power sources comprise a battery.

19. The switch system of claim 18, further comprising a vehicle including said fascia panel and providing said electrical power from said one or more power sources, and said ground.

20. The switch system of claim 19, where said plurality of accessory devices comprises a plurality of vehicle accessory devices.

* * * * *